(12) United States Patent
Knapp et al.

(10) Patent No.: US 9,093,876 B2
(45) Date of Patent: Jul. 28, 2015

(54) SYSTEMS AND METHODS FOR CONFIGURING STATORS OF DOWNHOLE ELECTRIC MOTORS

(75) Inventors: John M. Knapp, Claremore, OK (US); Sean A. Cain, Owasso, OK (US); Shane H. McGill, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 762 days.

(21) Appl. No.: 13/038,105

(22) Filed: Mar. 1, 2011

(65) Prior Publication Data

US 2012/0223603 A1   Sep. 6, 2012

(51) Int. Cl.
  *H02K 11/00*   (2006.01)
  *H02K 5/22*    (2006.01)
  *H02K 5/132*   (2006.01)

(52) U.S. Cl.
  CPC ............... *H02K 5/225* (2013.01); *H02K 5/132* (2013.01); *Y10T 29/49009* (2015.01)

(58) Field of Classification Search
  CPC ..................................................... H02K 5/225
  USPC ............................................... 310/71; 29/596
  See application file for complete search history.

(56) References Cited

U.S. PATENT DOCUMENTS

| | | | |
|---|---|---|---|
| 1,978,986 A * | 10/1934 | Coberly | 310/87 |
| 4,004,169 A | 1/1977 | Charlton | |
| 4,679,875 A * | 7/1987 | Ramsey | 439/604 |
| 5,175,458 A | 12/1992 | Lemmer | |
| 5,229,674 A | 7/1993 | Best | |
| 5,782,652 A | 7/1998 | Feher | |
| 6,288,470 B1 * | 9/2001 | Breit | 310/254.1 |
| 6,409,485 B1 * | 6/2002 | Ebner | 417/423.1 |
| 6,429,557 B2 | 8/2002 | Sheeran | |
| 7,696,660 B2 | 4/2010 | Koike | |
| 2007/0046115 A1 * | 3/2007 | Tetzlaff et al. | 310/71 |
| 2007/0071612 A1 | 3/2007 | Yuratich | |
| 2007/0273225 A1 * | 11/2007 | Head | 310/87 |
| 2008/0111434 A1 * | 5/2008 | Head | 310/87 |
| 2008/0284264 A1 * | 11/2008 | Yuratich et al. | 310/87 |
| 2009/0091202 A1 | 4/2009 | Parmeter | |
| 2010/0156215 A1 | 6/2010 | Goertzen | |

FOREIGN PATENT DOCUMENTS

| | | |
|---|---|---|
| WO | WO-2001039353 | 5/2001 |
| WO | WO-2010085446 | 7/2010 |

* cited by examiner

*Primary Examiner* — Hanh Nguyen
(74) *Attorney, Agent, or Firm* — Law Offices of Mark L. Berrier

(57) ABSTRACT

Systems and methods for configuring stators for downhole electric motors, where a single master stator can be configured to function as multiple different types of stators. In one embodiment, a configurable stator has a plurality of magnet windings disposed within its body, wherein the windings are connected to a plurality of electrical terminals that are accessible from the exterior of the body of the stator. Each of the terminals is configured to enable any one of a plurality of different types of lead wires to be attached to it, thereby enabling the stator to be configured in various different ways. In one embodiment, the master stator can be configured as a single stator, an upper tandem stator, a middle tandem stator, or a lower tandem stator.

20 Claims, 4 Drawing Sheets

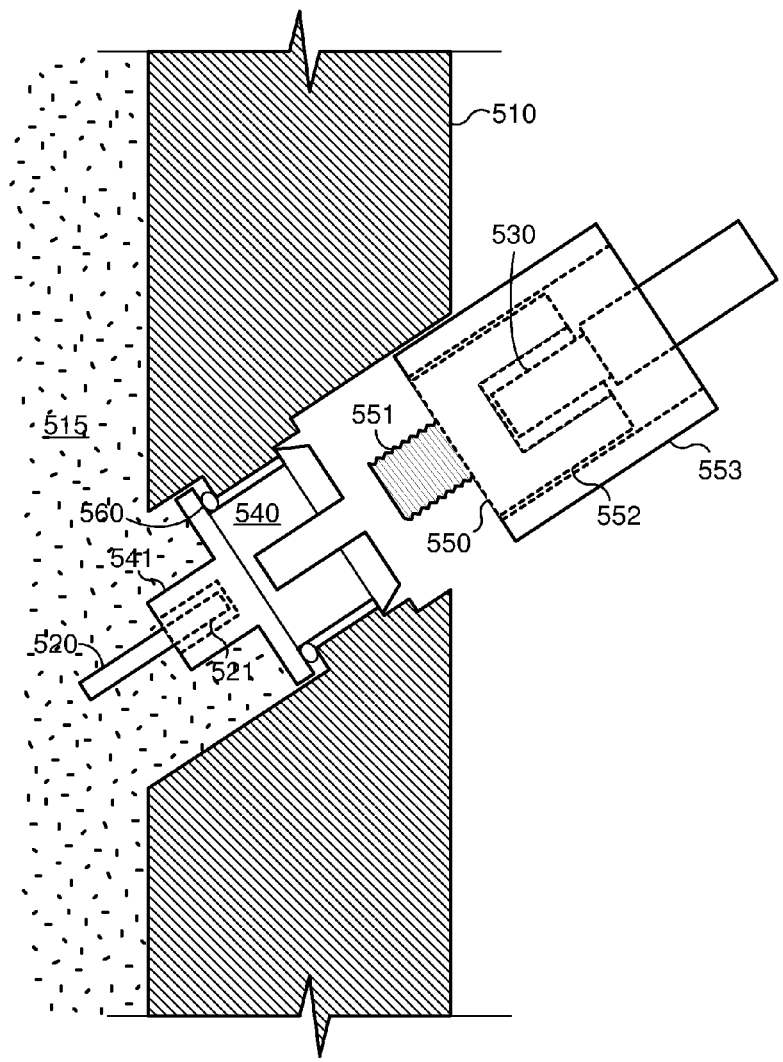
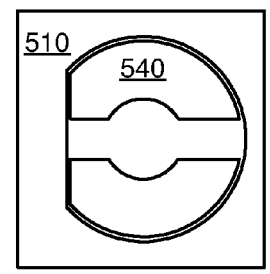
Fig. 6
Fig. 5

SYSTEMS AND METHODS FOR CONFIGURING STATORS OF DOWNHOLE ELECTRIC MOTORS

BACKGROUND

1. Field of the Invention

The invention relates generally to oil production equipment, and more particularly to systems and methods for configuring stators for downhole electric motors.

2. Related Art

Equipment used in the production of oil is very specialized and very costly. As a result, it is not cost effective for many companies that manufacture this equipment to have many manufacturing facilities. It is more cost effective to centralize the manufacture of the equipment in one facility (or very few facilities) and to ship the equipment to the various customers that will use it in their operations.

Because oil is produced throughout the world, the customers of a company that manufactures oil production equipment may be located far from the company's manufacturing facility. Consequently, it may take weeks or even months to ship equipment from the manufacturer's facility to the customers' locations. This can be problematic because, when a customer's existing equipment fails and replacement equipment is needed, the customer's oil production operations may have to be suspended while the customer waits for the replacement equipment. Such interruptions in the customer's operations are typically very costly in terms of lost production.

Manufacturers of oil production equipment may alleviate this problem to some extent by providing regional distribution facilities. While the equipment is manufactured in one facility, the equipment is shipped to the regional distribution facilities, where it is stored until being purchased by a customer that is within the corresponding region. Then, when a customer needs a piece of equipment, it can be shipped to the customer from the regional facility, thereby reducing the delivery time from weeks or months to days.

While the use of regional distribution facilities reduces the impact of shipping delays on the customer, it can be costly for the equipment manufacturer. As noted above, the equipment is very specialized, and it is difficult, if not impossible, to accurately gauge customer's needs for new equipment, particularly when the need arises from the unexpected failure of existing equipment. It is therefore necessary for the regional distribution facilities to stock at least one of each piece of equipment that may be needed by the customers on short notice. Because of the many different pieces of equipment that may be needed, and the cost of the equipment, it can be very costly for the equipment manufacturer to stock the regional distribution facilities.

It would therefore be desirable to provide means for manufacturers of oil production equipment to reduce the cost associated with providing this equipment to customers in a timely fashion.

SUMMARY OF THE INVENTION

One way to reduce the cost of maintaining inventory at regional distribution facilities is to reduce the quantity of the equipment that must be stocked at the facilities. In particular, this disclosure describes reconfigurable stators for downhole electric motors, where a single stator can be configured to function as multiple different types of stators. As a result, a single reconfigurable stator can be stocked, instead of the multiple conventional stators that were previously required. When a customer needs a new stator of a particular type, the reconfigurable stator can be configured as desired and provided to the customer.

One embodiment comprises an apparatus for use in a downhole electric motor, the apparatus comprising a configurable stator for the motor. The configurable stator has a plurality of magnet windings disposed within a body of the stator and a plurality of electrical terminals connected to the magnet windings. The connections between the windings and terminals are made within the body of the stator, but each of the terminals is accessible from the exterior of the body of the stator. Each of the terminals is configured to enable any one of a plurality of different types of lead wires to be attached to it, thereby enabling the stator to be configured in various different ways.

The terminals may be configured to enable the lead wires to be removed and reattached, so that the stator can be reconfigured. The lead wires may, for example, be connected to the corresponding electrical terminals via threaded connections. The lead wires may comprise a set of individual lead wires, an assembly in which the lead wires are coupled together to form a Y-point, a connector configured to be coupled to a power cable, or any other suitable configuration of lead wires. The stator may be configured to utilize 3-phase power, and may include three terminals at each of the upper and lower ends of the stator to provide electrical connections to the three sets of magnet windings in the stator. In one embodiment, the terminals are installed in an epoxy fixture at each end of the stator, where the epoxy fixture allows the magnet windings and connections to the terminals to be embedded in epoxy within the body of the stator. The apertures in the epoxy fixture in which the terminals are installed may be keyed to prevent rotation of the terminals within the apertures. The terminals may be oriented so that they are angled with respect to the axis of the stator.

An alternative embodiment comprises a downhole electric motor system that includes at least one rotor and one or more stators that are coupled to drive the rotor. At least one of the stators is a configurable stator having a plurality of magnet windings disposed within the body of the stator and a plurality of electrical terminals, wherein each of the magnet windings is electrically coupled to a corresponding one of the terminals within the body of the stator. The terminals are accessible from the exterior of the body of the stator, and are configured to enable any one of a plurality of different types of lead wires to be attached thereto, thereby enabling configuration of the stator.

Another alternative embodiment comprises a method for configuring a stator for use in a downhole electric motor. The method includes providing a configurable stator as described above, and configuring the stator by attaching a first set of one or more lead wires to the terminals of the stator. By attaching the first set of lead wires to the terminals of the stator, the stator is configured as one of the group consisting of a single stator, an upper tandem stator, a middle tandem stator, and a lower tandem stator. Prior to attaching the first set of lead wires to the terminals of the stator, the stator is not configured as any of this group of stators. The method may further include deconfiguring the stator by removing the first set of lead wires from the terminals of the stator, and thereafter reconfiguring the stator by attaching a second set of one or more lead wires from the terminals of the stator.

Numerous other embodiments are also possible.

BRIEF DESCRIPTION OF THE DRAWINGS

Other objects and advantages of the invention may become apparent upon reading the following detailed description and upon reference to the accompanying drawings.

FIG. 5 is a diagram illustrating the structure of a terminal connection at the end of a stator in accordance with one embodiment.

FIG. 6 is a diagram illustrating the keying of a terminal and the aperture into which the terminal is installed in accordance with one embodiment.

Figure 1:
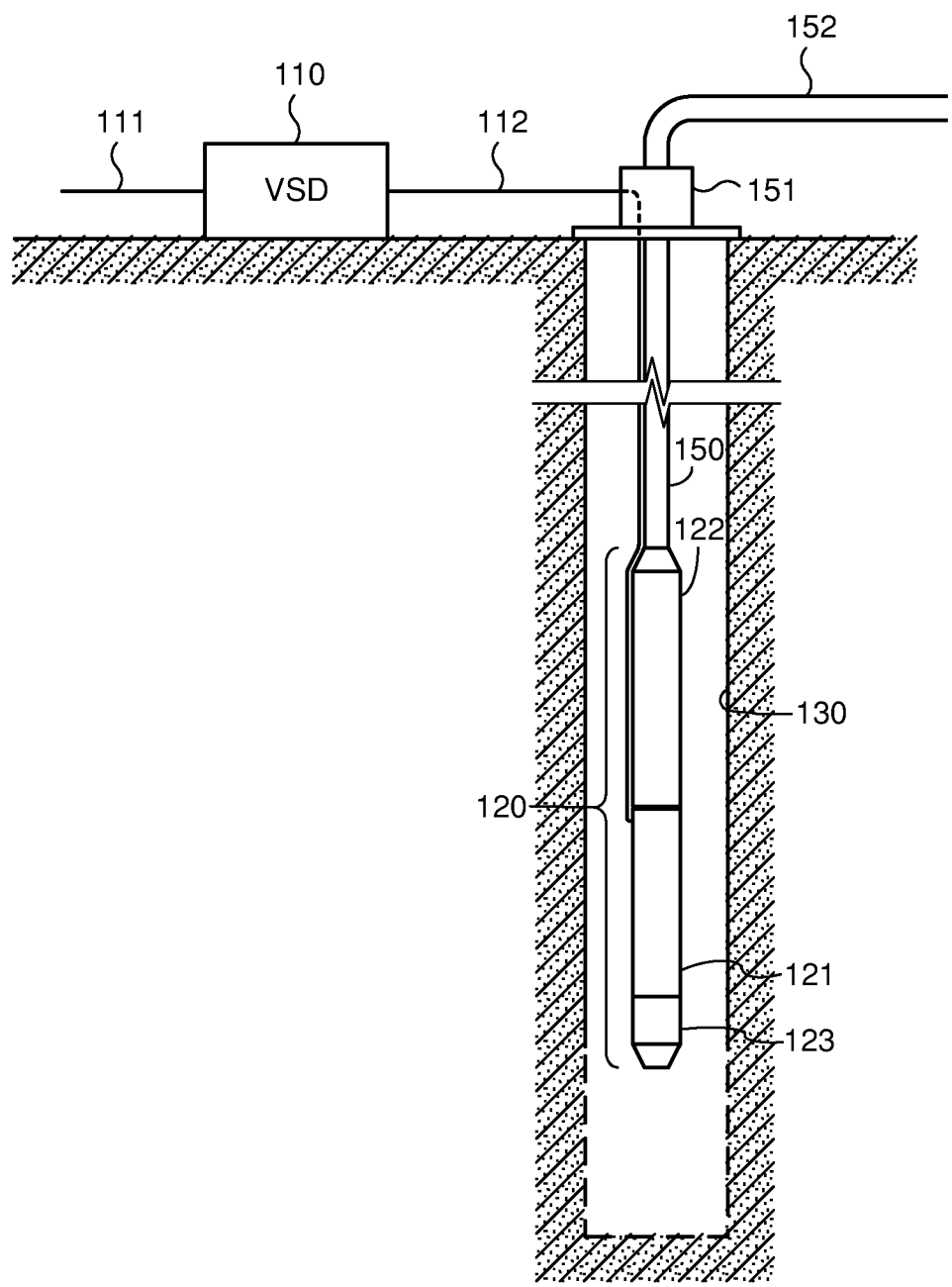
FIG. 1 is a diagram illustrating the use of a downhole electric motor in an electric submersible pump system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for configuring stators for downhole electric motors. The use of configurable stators allows manufacturers to meet their customers' needs for different types of stators (e.g., single, upper tandem, middle tandem and lower tandem) without having to stock each of these different types of single-configuration stators.

The present systems and methods utilize stators which have means to configure the flexible leads that are coupled to the stator windings. Each of the windings of a stator is internally coupled to a terminal which is accessible from the exterior of the stator. The stator is configured to function as a particular type of stator by attaching appropriate leads and/or other connectors to the terminals. The leads and/or connectors can, for example, configure the stator to accept a connection to a power cable, to be connected to another stator (in a tandem configuration), or to form a Y-point for the stator. In this manner, a single reconfigurable stator can replace multiple stators, each of which has a different configuration, thereby reducing the cost of maintaining an inventory of stators at a regional distribution facility.

Before describing exemplary embodiments of the invention, it may be helpful to review exemplary systems in which they may be used. Referring to FIG. 1, a diagram illustrating an exemplary pump system is shown. A wellbore 130 is drilled into an oil-bearing geological structure and is cased. The casing within wellbore 130 is perforated at the lower end of the well to allow oil to flow from the formation into the well. An electric submersible pump (ESP) system 120 is coupled to the end of tubing string 150, and the ESP and tubing string are lowered into the wellbore. An electrical power supply, such as a variable speed drive, 110 which is positioned at the surface is coupled to ESP 120 by power cable 112, which runs down the wellbore along tubing string 150.

ESP 120 includes an electric motor section 121 and a pump section 122. A gauge package 123 may be attached to the bottom of motor section 121. ESP 120 may include various other components which will not be described in detail here because they are well known in the art and are not important to a discussion of the invention.) Motor section 121 is operated to drive pump section 122, which pumps the well fluid through the tubing string and out of the well.

In this embodiment, motor section 121 uses a three-phase induction motor which is driven by variable speed drive 110. Variable speed drive 110 receives AC input power from an external source such as a generator or power grid (not shown in the figure) via input line 111. Drive 110 rectifies the AC input power and then produces three-phase AC output power at a voltage and frequency that is suitable to drive motor section 121 of ESP 120. This output power is provided to motor section 121 via power cable 112.

Figure 2:
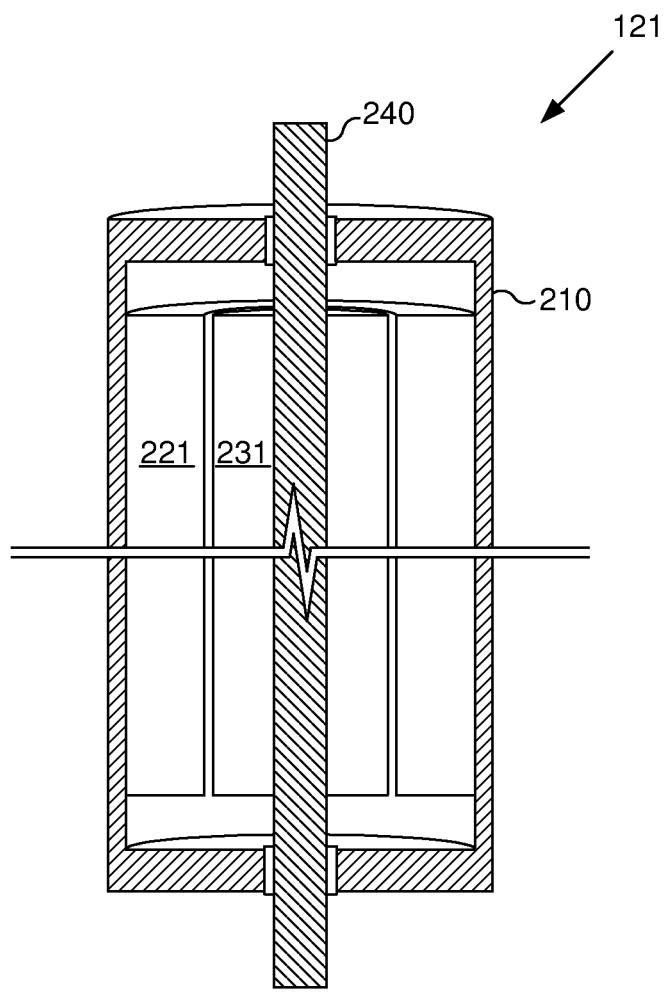
FIG. 2 is a diagram illustrating the general structure of an electric motor.

Referring to FIG. 2, a diagram illustrating the basic structure of motor section 121 is shown. Within housing 210 are a plurality of coils or windings of wire. These coils are typically placed into magnetic steel laminations of the stator 221 (the coils are not shown in the figure). The housing, laminations, and windings form the stator of the motor. The conductors of power cable 112 are coupled to the windings so that the drive signals supplied by variable speed drive 110 energize the windings. In this embodiment, the motor is an induction motor, so rotor 231 has magnetic steel laminations interspersed with conductive bars and rings. When the windings of the stator are energized, they generate the magnetic fields that cause the rotor to rotate. The housing and shaft of motor 121 are connected to the housing and shaft, respectively, of pump 122 to enable the motor to drive the pump.

Depending upon the particular application in which the motor is used, it may need to produce from as little as 15 horsepower to as much as 3000 horsepower. Because the size of the motor is constrained by the size of the borehole in which it will be used, the power of the larger motors is increased by increasing their lengths. While this is not difficult to do conceptually, it presents some practical problems, as the higher-horsepower motors may be over 100 feet in length. This is too long to be shipped to a customer, so these motors must be constructed in sections that can be shipped to the customer separately, and then assembled into a single unit as the motor is lowered into the borehole. This type of sectioned motor may be referred to as a tandem motor.

Figure 3:
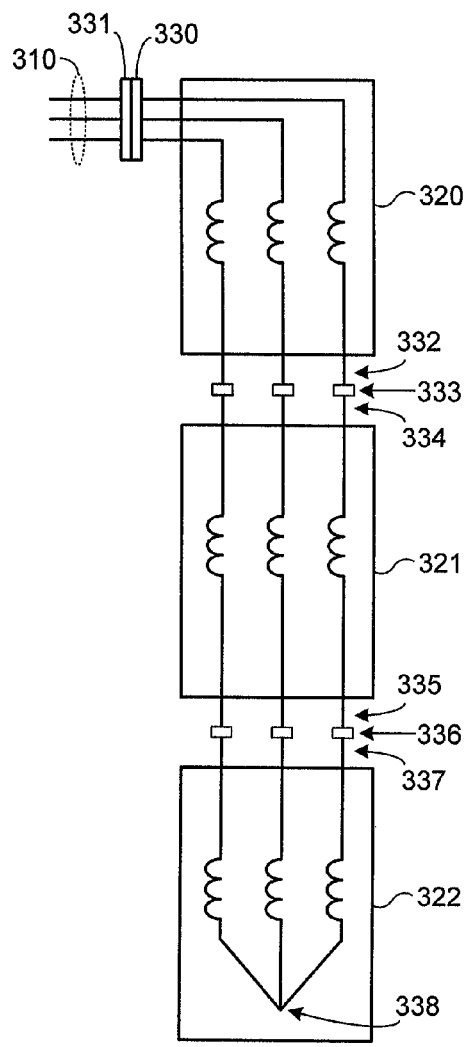
FIG. 3 is a diagram illustrating the interconnection of the stators of the different sections of a tandem motor.

The stators of these separate motor sections must be configured to be connected to each other, so that power from a drive unit is provided to each of the stators. The interconnection of the stators of the different sections is illustrated in the diagram of FIG. 3. Typically, a power cable 310 is coupled to the stator of the uppermost (upper tandem) stator 320. The windings of this stator are connected to the windings of the adjacent section's (middle tandem) stator 321 so that power from the upper stator passes to the adjacent stator. Each successive stator is connected to the adjacent one in this manner. The lowermost (lower tandem) stator 322 typically has the lower ends of the stator windings coupled together to form a Y-point 338.

It can be seen that the upper, middle and lower stators (320-322, respectively) are each configured differently. For example, upper tandem stator 320 is configured at its upper end to be coupled to power cable 310, while its lower end is configured to be coupled to an adjacent stator 321. The coupling to the power cable is normally a plug-in-type connection in which the conductors of the power cable terminate at a first connector 331, and the conductors of the stator windings terminate at a second connector 330 which is configured to mate with the first connector. The coupling to the adjacent stator consists of individual, flexible lead wires 332 that extend outward from the lower end of the stator. Each lead wire is terminated with a connector 333 that is configured to mate with a connector of a corresponding lead wire extending from the upper end of the adjacent stator. These lead wires must be sturdy enough to allow them to be connected without damage, and flexible enough to allow them to be curled into the space between the motor sections.

Middle tandem stator 321 is configured with individual, flexible lead wires 334, 335 that extend outward from both the upper and lower ends of the stator. The lead wires at each end of this stator are configured in essentially the same manner as those at the lower end of stator 320, except that the lead wire connectors at the upper end of one stator are designed to mate with the lead wire connectors at the lower end of another stator.

Lower tandem stator 322 is configured with individual, flexible lead wires 337 that extend outward from the upper end of the stator and are configured to be connected (via connectors 336) to the lead wires at the lower end of middle tandem stator 321. At the lower end of lower tandem stator 322, the wires of the stator windings are connected to each other to form a Y-point 338. Conventionally, the windings are connected to form the Y-point within the housing of the stator, where they are not accessible to a person who is performing on-site assembly of the motor.

It should be noted that, while FIG. 3 depicts a tandem motor that has three sections (upper, middle, lower), other tandem motors may have only two sections (upper and lower), or more than three sections (upper, multiple middle and lower). A motor may also be a single unit, rather than a multi-section tandem motor. The single motor will typically have a connection to the power cable at its upper end, and a Y-point at its lower end.

Conventionally, a stator is configured by the manufacturer as one of these different types and cannot be changed. Connections between the magnet wires that form the windings of the stator and the flexible lead wires that extend outward from the stator are normally embedded in epoxy or varnish within the stator housing. Consequently, when the manufacturer produces a stator, it is either a single, an upper tandem, a middle tandem, or a lower tandem. When a customer needs a particular type of stator, he must purchase a stator that was constructed as that type of stator, even though the windings and internal construction of these different types of stators may be identical. Thus, the manufacturer may have to stock its regional distribution facilities with all of these different types of stators.

Figure 4:
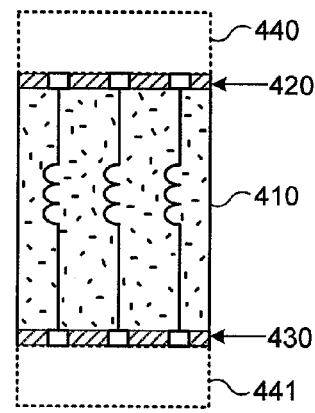
FIG. 4 is a diagram illustrating a master stator in which magnet windings are connected to interfaces at each end of the stator.

The present system eliminates the need to stock all of the different types of stators (e.g., single, upper tandem, etc.) by providing a master stator that has an interface at each end which enables the connection of appropriately configured lead wires. FIG. 4 is a functional block diagram illustrating this concept. Stator 410 contains the windings of magnet wire embedded in epoxy. A first end of each winding is coupled to an interface 420 at the upper end of the stator, and a second end of each winding is coupled to an interface 430 at the lower end of the stator. Each interface includes one or more terminals in an epoxy fixture as shown in FIG. 5. Lead wires or lead wire assemblies 440, 441 can then be connected to the interfaces as needed. For instance, if an upper tandem stator is needed, a power cable connector can be coupled to upper interface 420 and individual leads can be coupled to lower interface 430.

Referring to FIG. 5, a diagram illustrating the interfaces in one embodiment is shown. As noted above, the windings of the stator are formed with magnet wire, which is typically less flexible and more prone to damage (e.g., through broken insulation) than lead wire. The magnet wire is protected and further insulated by filling the stator body with epoxy. An epoxy fixture 510 is provided to contain the epoxy 515. The end 521 of the magnet wire 520 is secured within a crimp fitting 541 of conductive terminal 540. Terminal 540 is secured within an aperture in epoxy fixture 510. In this embodiment, terminal 540 is a snap fitting which locks into place in the aperture. An o-ring 560 is positioned around terminal 540 to form a seal between the terminal and epoxy fixture 510. The stator body is filled with epoxy after terminal 540 has been installed in epoxy fixture 510.

The portion of terminal 540 which is accessible from the exterior of the stator is internally threaded to accept conductive connector 550. Connector 550 has an externally threaded portion 551 which mates with terminal 540, and a crimp fitting 552 which is configured to accept lead wire 530. An insulating boot 553 is positioned around connector 550 to insulate the portions of connector 550 and lead wire near the exterior surface of the stator body.

In this embodiment, terminal 540 and the aperture into which it is inserted have a portion which is flat (see FIG. 6) or otherwise keyed to prevent the terminal from rotating when connector 550 is screwed in to the terminal. It should also be noted that the aperture in which terminal 540 is installed is angled with respect to the exterior surface of epoxy fixture 510 (which, in this embodiment, is perpendicular to the axis of the stator). In this case, when the lead wire is connected to the terminal, the lead wire is angled with respect to the end of the stator (rather than being parallel to the stator's axis), making it easier to curl the wire into the space between the ends of adjacent stators when they are assembled.

It should be noted that, for the purposes of the claims below, "lead wires" should be construed to include not only individual lead wires, but also wire assemblies (e.g., three lead wires connected to each other to form a Y-point), power cable connectors or any other appropriate connections to the terminals/windings of the stator.

It should also be noted that alternative embodiments of the invention may include features and/or components that are variations of those found in the exemplary embodiments described above. For instance, while the terminals and lead wire connectors described above use a threaded connection, they may alternatively use plug-in connections or other suitable means for connecting the lead wires to the terminals. Further, the terminals and lead wire connectors may be crimped onto the respective wires, soldered to the wires, or connected by other means. The connections between the terminals and lead wire connectors may be removable, so that the lead wires can be attached, removed, reattached, and so on, or they may be permanent, so that the master stator can only be configured once.

In the exemplary embodiments described above, the stators are assumed to be designed to utilize 3-phase power because this is typical for downhole electric motors. Alternative embodiments may use other types of power to energize the stators and may consequently use different numbers and/or types of terminals and lead wire connections. Additionally, although it is preferred that each end of the master stator be configurable (i.e., have terminals to accept the desired lead wire connections), alternative embodiments may only be configurable at one end.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. An apparatus for use in a downhole electric motor, the apparatus comprising:
    a configurable stator for a downhole electric motor having
        a plurality of magnet windings disposed within a housing of the stator and
        a plurality of electrical terminals,
        wherein each of the magnet windings is electrically coupled to a corresponding one of the terminals within the housing of the stator,
        wherein each of the terminals is accessible from the exterior of the housing of the stator, and
        wherein each of the terminals is configured to enable any one of a plurality of different types of lead wires to be attached thereto
        wherein the stator is alternately configurable by attachment of the lead wires to the terminals as one of a plurality of distinct types of stators consisting of a single stator, an upper tandem stator, a middle tandem stator, and a lower tandem stator;
        wherein prior to attachment of the lead wires to the terminals of the configurable master stator, the configurable master stator is not configured as any of the group consisting of a single stator, an upper tandem stator, a middle tandem stator, and a lower tandem stator.

2. The apparatus of claim 1, wherein each of the terminals is configured to enable lead wires to be removably attached thereto.

3. The apparatus of claim 1, further comprising a plurality of lead wires, wherein each of the lead wires is attached to a corresponding one of the electrical terminals.

4. The apparatus of claim 3, wherein each of the lead wires is connected to the corresponding one of the electrical terminals via a threaded connection.

5. The apparatus of claim 4, wherein the housing of the stator comprises an epoxy fixture, wherein the terminals are installed in apertures in the epoxy fixture, and wherein the terminals are keyed to the corresponding apertures to prevent rotation of the terminals within the apertures.

6. The apparatus of claim 3, wherein the plurality of lead wires comprises a set of individual lead wires.

7. The apparatus of claim 3, wherein the plurality of lead wires comprises an assembly in which the lead wires are coupled together to form a Y-point.

8. The apparatus of claim 3, wherein the plurality of lead wires comprises an assembly in which the lead wires are coupled to a connector, wherein the connector is configured to be coupled to a power cable.

9. The apparatus of claim 1, wherein the stator comprises a 3-phase stator.

10. The apparatus of claim 1, wherein the housing of the stator comprises an epoxy fixture, wherein the terminals are installed in the epoxy fixture, and wherein the magnet windings and the couplings of the magnet windings to the terminals are embedded in epoxy within the housing of the stator.

11. The apparatus of claim 1, wherein the stator has a first end and a second end opposite the first end, wherein each winding has a first end connected to at least a first corresponding terminal at the first end of the stator and a second end connected to at least a second corresponding terminal at the second end of the stator.

12. The apparatus of claim 1, wherein each of the terminals is oriented so that an axis of the terminal is non-parallel with an axis of the stator.

13. A method for configuring a stator for use in a downhole electric motor, the method comprising:
    providing a configurable master stator, wherein the configurable master stator has a plurality of magnet windings disposed within a housing of the stator and a plurality of electrical terminals, wherein each of the magnet windings is electrically coupled to a corresponding one of the terminals within the housing of the configurable master stator, wherein each of the terminals is accessible from the exterior of the housing of the configurable master stator, and wherein each of the terminals is configured to enable any one of a plurality of different types of lead wires to be attached thereto; and
    attaching a first set of one or more lead wires to the terminals of the configurable master stator;
    wherein after attaching the first set of lead wires to the terminals of the configurable master stator, the configurable master stator is configured as one of the group consisting of a single stator, an upper tandem stator, a middle tandem stator, and a lower tandem stator;
    wherein prior to attaching the first set of lead wires to the terminals of the configurable master stator, the configurable master stator is not configured as any of the group consisting of a single stator, an upper tandem stator, a middle tandem stator, and a lower tandem stator.

14. The method of claim 13, further comprising deconfiguring the stator by removing the first set of lead wires from the terminals of the stator, and thereafter reconfiguring the stator by attaching a second set of one or more lead wires to the terminals of the stator.

15. An electric submersible pump system comprising:
    a pump;
    a motor coupled to drive the pump, wherein the motor includes
        at least one rotor, and
        one or more stators coupled to drive the rotor,
        wherein at least one of the stators is a configurable master stator having a plurality of magnet windings disposed within a housing of the master stator and a plurality of electrical terminals, wherein each of the magnet windings is electrically coupled to a corresponding one of the terminals within the housing of the master stator, wherein each of the terminals is accessible from the exterior of the housing of the stator, wherein the master stator is alternately configurable as one of a plurality of distinct types of stators by attachment of distinct types of lead wires to the terminals.

16. The electric submersible pump system of claim 15:
wherein attachment of the lead wires to the terminals of the master stator configures the master stator as one of the group consisting of a single stator, an upper tandem stator, a middle tandem stator, and a lower tandem stator; and wherein prior to attachment of the lead wires to the terminals of the master stator, the configurable master stator is not configured as any of the group consisting of the single stator, the upper tandem stator, the middle tandem stator, and the lower tandem stator.

17. The downhole electric motor system of claim 16, wherein the lead wires include one assembly in which the lead wires are coupled together to form a Y-point.

18. The electric submersible pump system of claim 15, further comprising an electric drive system, wherein the electric drive system is coupled to a power cable, wherein the power cable is coupled through one or more of the lead wires to one or more of the terminals of the one or more configurable master stators of the motor, wherein the electric drive system provides power to the motor and thereby drives the motor.

19. The electric submersible pump system of claim 15, wherein the one or more stators comprise at least two configurable stators.

20. The electric submersible pump system of claim 15, wherein the master stator has an interface at each end of the housing, wherein each interface comprises an epoxy fixture, wherein the terminals are installed in the epoxy fixture, and wherein the magnet windings and the couplings of the magnet windings to the terminals are embedded in epoxy within the housing of the stator.

* * * * *